US012600271B2

(12) United States Patent
Oltman

(10) Patent No.: US 12,600,271 B2
(45) Date of Patent: Apr. 14, 2026

(54) CHILD RESTRAINT

(71) Applicant: Dorel Juvenile Group, Inc., Foxboro, MA (US)

(72) Inventor: Stephen B. Oltman, Hope, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 125 days.

(21) Appl. No.: 18/377,071

(22) Filed: Oct. 5, 2023

(65) Prior Publication Data

US 2024/0116412 A1     Apr. 11, 2024

Related U.S. Application Data

(60) Provisional application No. 63/413,803, filed on Oct. 6, 2022.

(51) Int. Cl.
B60N 2/28 (2006.01)

(52) U.S. Cl.
CPC ......... B60N 2/2812 (2013.01); B60N 2/2806 (2013.01); B60N 2/2821 (2013.01)

(58) Field of Classification Search
CPC .. B60N 2/2812; B60N 2/2806; B60N 2/2821; B60N 2/2869
See application file for complete search history.

(56) References Cited

U.S. PATENT DOCUMENTS 5,884,967 A     3/1999  Gasper
7,029,069 B2    4/2006  Hendren

| | | | |
|---|---|---|---|
| 7,216,932 B2 * | 5/2007 | Emmert | B60N 2/2806 |
| | | | 297/256.16 |
| 7,597,396 B2 | 10/2009 | Longenecker | |
| 7,753,445 B2 * | 7/2010 | Kassai | B60N 2/2824 |
| | | | 297/256.16 |
| 7,988,230 B2 * | 8/2011 | Heisey | B60N 2/2806 |
| | | | 297/256.16 |
| 8,262,161 B2 | 9/2012 | Fritz | |
| 8,845,022 B2 | 9/2014 | Strong | |
| 9,365,135 B2 * | 6/2016 | Carpenter | B60N 2/2845 |
| 9,415,706 B2 * | 8/2016 | Rabeony | B60N 2/2824 |
| 9,469,222 B2 | 10/2016 | Williams | |

(Continued)

FOREIGN PATENT DOCUMENTS

| | | |
|---|---|---|
| EP | 1145898 A1 | 10/2001 |
| FR | 2946582 A1 | 12/2010 |

OTHER PUBLICATIONS

Office Action (Final Rejection) dated Aug. 28, 2025 for U.S. Appl. No. 18/377,079 (pp. 1-5).

(Continued)

*Primary Examiner* — Milton Nelson, Jr.
(74) *Attorney, Agent, or Firm* — Barnes & Thornburg LLP

(57) ABSTRACT

A child restraint includes a seat base adapted to be secured to a vehicle seat. The seat base includes a seat-base foundation formed to include a vehicle seatbelt path and a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat. The child restraint further includes a juvenile seat adapted to be secured to the seat base and a seat-release system.

20 Claims, 3 Drawing Sheets

(56)     References Cited

U.S. PATENT DOCUMENTS

| 10,710,478 | B2 | 7/2020 | Reaves |
| 2017/0120783 | A1* | 5/2017 | Denbo ................. B60N 2/2821 |
| 2021/0178938 | A1 | 6/2021 | Williams |
| 2021/0237626 | A1 | 8/2021 | Longenecker |
| 2021/0394653 | A1 | 12/2021 | Li |

OTHER PUBLICATIONS

Office Action (Non-Final Rejection) dated May 20, 2025 for U.S. Appl. No. 18/377,079 (pp. 1-6).

\* cited by examiner

SIDEWAYS ORIENTATION

FORWARD-FACING ORIENTATION

SEATBELT RETAINER OPENED

SEATBELT RETAINER CLOSED

VEHICLE SEAT

CHILD RESTRAINT

PRIORITY CLAIM

This application claims priority under 35 U.S.C. § 119(e) to U.S. Provisional Application Ser. No. 63/413,803, filed Oct. 6, 2022, which is expressly incorporated by reference herein.

BACKGROUND

The present disclosure relates to child safety devices, and particularly to child seats. More particularly, the present disclosure relates to child seat for use in a vehicle.

SUMMARY

According to the present disclosure, a child restraint, in accordance with the present disclosure, includes a seat base adapted to be secured to a vehicle seat. The seat base includes a seat-base foundation formed to include a vehicle seatbelt path and a vehicle seatbelt retainer coupled to the seat-base foundation. The vehicle seatbelt retainer is configured to pivot between an opened or released position and a closed or clamped position. In the released position, the vehicle seatbelt retainer is spaced away from the vehicle seatbelt path. In the clamped position, the vehicle seatbelt retainer overlies the vehicle seatbelt path and clamps a vehicle seat belt to the seat-base foundation to secure the seat base to the vehicle seat.

In illustrative embodiments, the child restraint further includes a juvenile seat coupled to the seat base and configured to hold a child for transportation in a vehicle and a seat-release system configured to control connection between the juvenile seat and the seat base. The juvenile seat is movable relative to the seat base between a use position and a base-installation position. In the use position, the juvenile seat is installed upright on the seat base and is configured to receive and secure a child to within a child-receiving space provided by the juvenile seat. In the base-installation position, the juvenile seat is detached from the seat base to provide clearance for the seatbelt retainer to move between the released position and the clamped position. The seat-release system is configured to block separation of the juvenile seat from the seat base and/or is configured to block use of the juvenile seat without the seat base until one or more conditions are met.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a child restraint including seat base and a juvenile seat adapted to be secured to the seat base, the seat base having a seat-base foundation configured to mount to a vehicle seat and a vehicle seatbelt retainer configured to move from a released or opened position to expose a belt path surface of the seat base foundation and a clamped or closed position to clamp a vehicle seatbelt to the seat-base foundation while the juvenile seat is at least partially separated from the seat base, and showing that the child restraint further includes a seat-release system configured to block use of the juvenile seat when the juvenile seat is detached from the seat base; and FIG. 2 is a perspective view of the child restraint showing the juvenile seat in a use position installed on the seat base and showing that the seat-release system is includes first and second seat locks configured to block separation of corresponding strap anchors from the seat locks until the juvenile seat is installed on the seat base so that the juvenile seat cannot be used to secure a child without first being installed on the seat base;

Figures 3, 4, 5, 6:
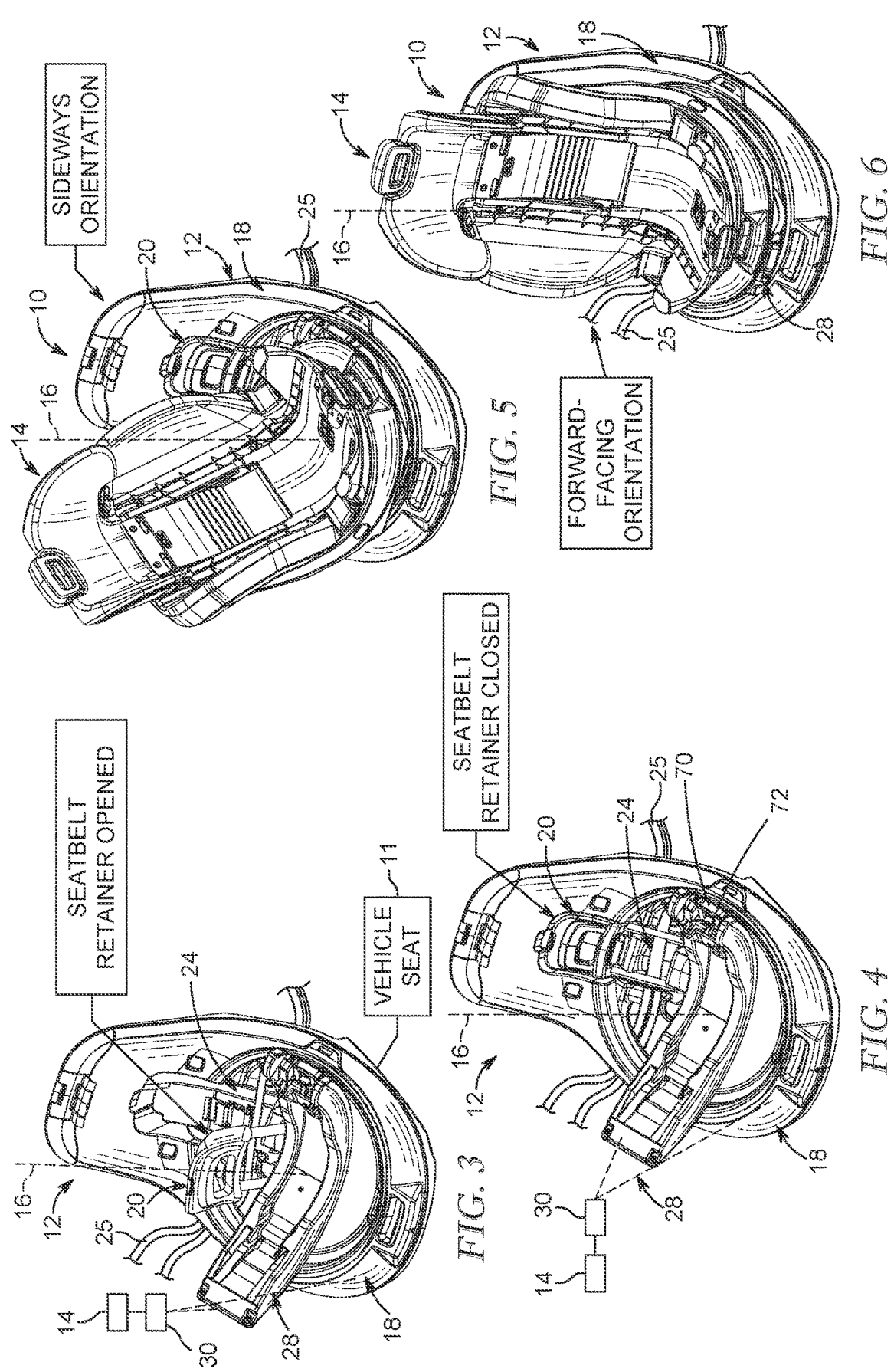
FIG. 3 is a perspective and diagrammatic view of the of the seat base showing the seatbelt retainer in the opened position to expose the belt path surface of the seat base foundation.
FIG. 4 is a view similar to FIG. 3 showing the seatbelt retainer in the closed position clamping the vehicle seat belt to the seat-base foundation.

FIG. 5 is a perspective view showing the juvenile seat mounted on the seat base in the use position and oriented in a sideways orientation after the seat-belt retainer has been moved to the closed position to clamp the vehicle seat belt to the seat-base foundation; and FIG. 6 is a perspective view showing the juvenile seat in the use position and rotated relative to the seat-base foundation to a forward-facing orientation to overlie the seat-belt retainer while the seat belt retainer is in the closed position.

DETAILED DESCRIPTION

Figure 1:
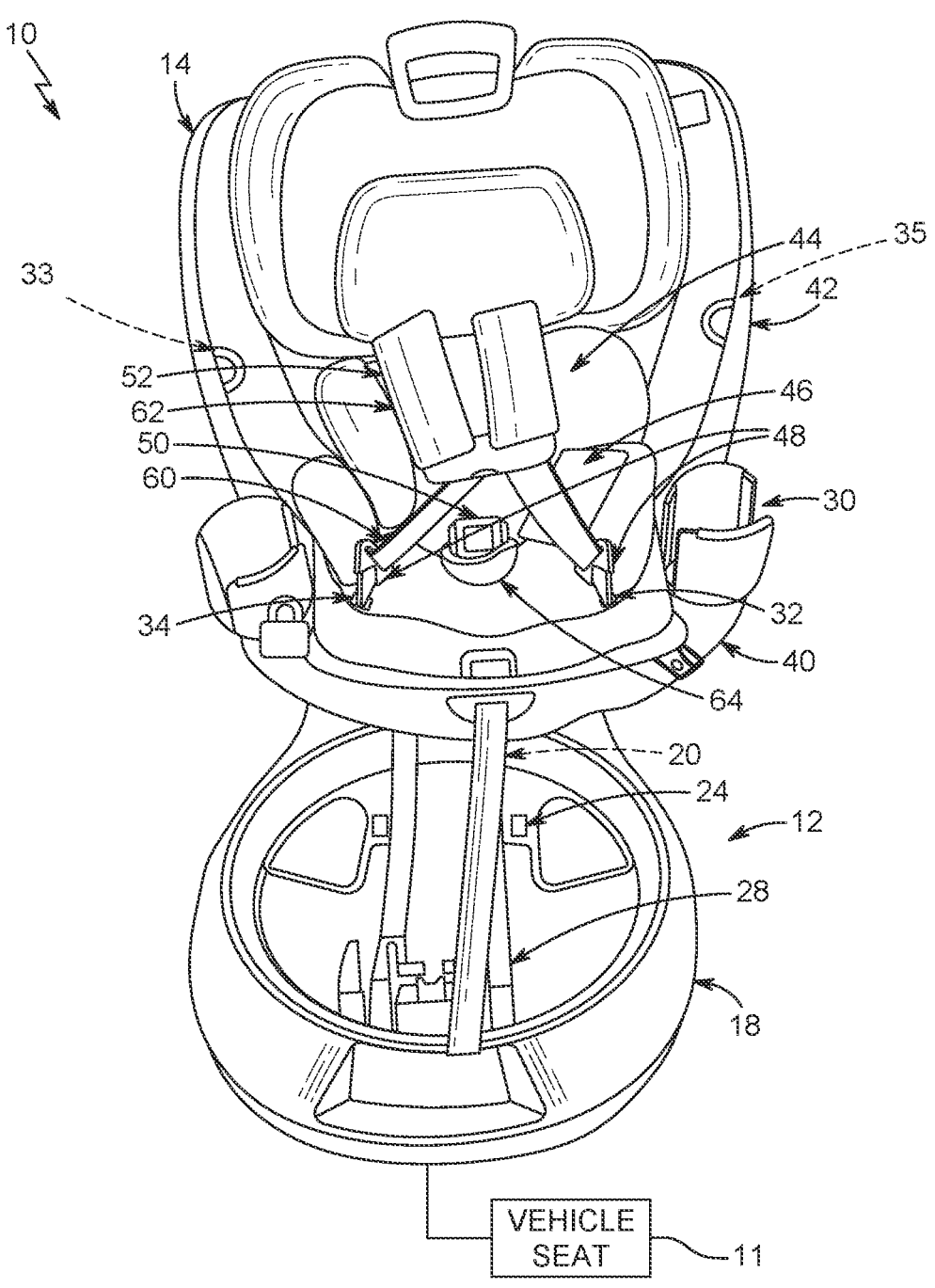

A child restraint 10 includes a seat base 12 adapted to rest on a vehicle seat 11 and a juvenile seat 14 coupled to the seat base 12 as shown in FIG. 1. The juvenile seat 14 is rotatable about a vertical rotation axis 16 to change the juvenile seat 14 from a forward facing orientation to a rearward facing orientation relative to the seat base 12. In some embodiments, the juvenile seat 14 is at least partially detachable from the seat base 12 so that the seat base 12 can be secured properly to the vehicle seat 11 prior to arrangement of the juvenile seat 14 in the forward facing orientation or the rearward facing orientation.

The seat base 12 includes seat base foundation 18 and a vehicle seat-belt retainer 20 mounted to the seat base foundation 18 for movement between a released position and a clamped position. In the released position, at least a portion of the vehicle seat-belt retainer 20 is spaced apart from the seat base foundation 18 to expose a vehicle seatbelt path 24. In the clamped position, the vehicle seat-belt retainer 20 overlies the vehicle seatbelt path 24 and is configured to clamp a vehicle seat belt between the vehicle seatbelt retainer 20 and the seat base foundation to secure the seat base 12 to the vehicle seat 11. Reference is hereby made to U.S. Publication No. US-2023/0045293 filed Aug. 5, 2022 and entitled SEAT BASE FOR A CHILD RESTRAINT for disclosure relating to use of a vehicle seatbelt retainer, which application is hereby incorporated in its entirety herein.

Figure 2:
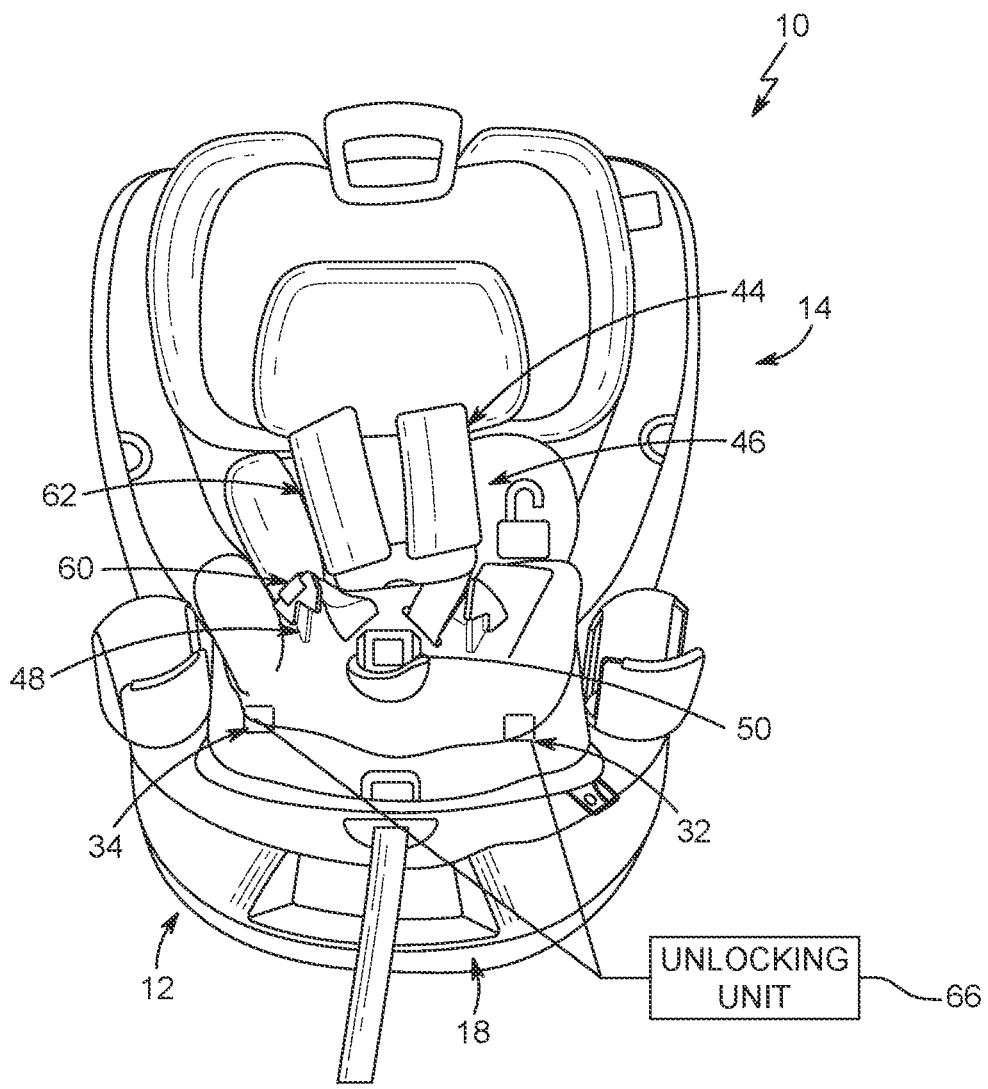

The seat base 12 may further include a seat-orientation controller 28 coupled to the seat-base foundation 18 as shown in FIGS. 1 and 2. The seat-orientation controller 28 is configured to secure the juvenile seat 14 to the seat base 12 and allows selective rotation of the juvenile seat 14 relative to the seat base foundation 18 about the vertical rotation axis 16 with the juvenile seat 14. The seat-orientation controller 28 may also allow selective recline of the juvenile seat 14 relative to the seat base foundation 18. In some embodiments, the vehicle seatbelt retainer 20 may only be able to move from the clamped position to the release position when the juvenile seat 14 is at least partially detached from the seat-orientation controller 28. Reference is hereby made to U.S. Provisional Application No. 63/419,505 filed Oct. 26, 2022 and entitled CHILD RESTRAINT for disclosure relating to use of a seat-orientation controller for juvenile seat attachment, rotation, and recline capabilities, which application is hereby incorporated in its entirety herein.

The juvenile seat 14 includes a seat bottom 40, a seat back 42 arranged to extend upwardly from the seat bottom 40, and a child-restraint harness 44 configured to restrain a child to the juvenile seat 14. The child restraint harness 44 includes a plurality of harness straps 46 that each have a corresponding strap anchor 48. The strap anchors 48 are configured to couple to a harness buckle 50 to retrain the child to the juvenile seat 14.

The child restraint 10 in the illustrative embodiment further includes a seat-release system 30 configured to block use of the juvenile seat 14 when the juvenile seat 14 is detached from the seat base 12 as shown in FIGS. 1 and 2. The seat-release system 30 includes at least one strap lock 32. In the illustrative embodiment, the strap lock 32 is coupled to the juvenile seat 14 and is configured to receive one of the strap anchors 48 attached to the child-restraint harness 46 when the juvenile seat 14 is separated from the seat base 12.

With the juvenile seat 14 detached from the seat base 12, the vehicle seatbelt retainer 20 is able to be accessed by a user to properly install the seat base 12 to the vehicle seat 11. The strap lock 32 is configured to block separation of the at least one strap anchor 48 from the strap lock 32 until the juvenile seat 14 is properly installed on the seat base 12. In this way, the strap lock 32 allows proper installation of the seat base 12 to a vehicle seat 11, but also blocks use of the juvenile seat 14 without the seat base 12 so that the juvenile seat 14 is only used with the seat base 12. In some embodiments, the strap lock 32 may be configured to allow removal and/or attachment of the juvenile seat 14 from/to the seat base 12 only when one of the strap anchors 48 is received in the strap lock 32.

The strap lock 32 is a separate component from the harness buckle 50 and spaced apart from the harness buckle 50 indicate to users that the strap lock 32 is not used in restraining the child to the juvenile seat 14. For example, the strap lock 32 may be located outside of a child-receiving space 52 provided by the seat bottom 40 and the seat back 42 so that the strap lock is not able to be used in restraining the child to the juvenile seat. In one embodiment, strap locks 33, 35 are provided with apertures formed into opposite lateral sides of the juvenile seat 14 outside of the child-receiving space 52 and facing away from each other. In some embodiments, the strap lock 32 is in a location which is covered by the child when the child is seated on the juvenile seat 14, such as a thigh region, a back region, or any other region under the child.

In the illustrative embodiment, the seat-release system 30 includes first and second hip strap locks 32, 34 both of which are separate from the harness buckle 50 as shown in FIG. 1. The hip strap locks 32, 34 are each configured to receive a corresponding strap anchor 48 of hip straps 60. In other embodiments, the strap locks 32, 34 may receive strap anchors of other straps included in child-restraint harness 44 such as shoulder straps 62 or a crotch strap 64. Additional strap locks may be included in the juvenile seat to receive more than two of the strap anchors 48 included in the child-restraint harness 44.

At least one of the seat base 12 and the juvenile seat 14 may further include an unlocking unit 66 that is configured to change the strap lock(s) 32, 24 from a locked state to an unlocked state. In the locked state, the strap anchors 48 are blocked from being removed from the strap locks 32, 34 when the juvenile seat 14 is detached from the seat base 12. In the unlocked state, the strap anchors 48 are free to be separated from the strap locks 32, 34 in response to the juvenile seat 14 being properly installed on the seat base 12. The unlocking unit 66 may directly or indirectly engage the strap locks 32, 34, or a portion thereof, during attachment of the juvenile seat 14 to the seat base 12 to change the strap locks 32, 34 from the locked state to the unlocked state.

FIGS. 3-6 show seat base 12 in various positions with juvenile seat 14. FIG. 3 shows the vehicle seatbelt retainer 20 unlocked from the seat-base foundation 18 and in the opened position exposing the seatbelt path 24. To assume the opened position, the seat-orientation controller 28 has been rotated about the vertical rotation axis 16 to a sideways orientation. The juvenile seat 14 is shown diagrammatically in FIGS. 3 and 4 in the base-installation position separated from the seat base 12 while the seat-orientation controller 28 is in the sideways orientation. In these positions, the seat-orientation controller 28 provides clearance for a user to open the seatbelt retainer 20 and route a vehicle seatbelt 25 across the seatbelt path 24 of the seat-base foundation 18. Once the vehicle seatbelt 25 is placed within the seatbelt path 24 the seatbelt retainer 20 can be pivoted to the closed position to clamp the vehicle seatbelt 25 in place and secure the child restraint 10 to the vehicle seat 11.

FIGS. 5 and 6 show the juvenile seat 14 in the use position after the seatbelt retainer 20 has been moved to the clamped position. The use position of the juvenile seat 14 can be a sideways orientation facing a door of the vehicle for child ingress and egress or a transportation orientation (i.e. forward-facing or rearward facing) for child transportation in the vehicle. It should be appreciated that the seat-orientation controller 28 is movable with the juvenile seat 14 to the sideways orientation or the transportation orientation. The seat-orientation controller 28 is optional and the juvenile seat 14 may attach directly to the seat-base foundation 18 in the use position.

At least one of the seat base 12 and the juvenile seat 14 includes a latch 72 configured to engage a portion of the juvenile seat 14 and retain the juvenile seat 14 to the seat base 12 as shown in FIG. 4. At least one of the seat base 12 and the juvenile seat 14 includes a release actuator or handle 70 configured release the latch 70 to allow separation of the juvenile seat 14 from the seat base 12. At least one of the latch 72 and the release actuator 70 is blocked from moving to release the juvenile seat 14 from the seat base 12 until at least one of the first and second strap anchors 48 are installed with at least one of the first and second seat locks 32, 34. In the illustrative embodiment, the latch 72 and release actuator 70 are coupled to the seat-orientation controller 28, however, the latch 72 and release actuator 70 may be coupled to the seat-base foundation 18.

The invention claimed is:

1. A child restraint comprising
a seat base adapted to be secured to a vehicle seat, the seat base comprising a seat-base foundation formed to include a vehicle seatbelt path, a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat, a juvenile seat configured to be installed on the seat base, the juvenile seat includes a seat bottom, a seat back arranged to extend upwardly from the seat bottom, and a child-restraint harness configured to restrain a child to the juvenile seat, the child restraint harness includes first and second harness straps and a harness buckle, each harness strap having a corresponding strap anchor configured to couple to the harness buckle, and a seat-release system including first and second strap locks coupled to the juvenile seat and spaced apart from the harness buckle, wherein the juvenile seat is movable relative to the seat base between a base-installation position, in which the juvenile seat is separated from the seat base and each strap anchor is locked in a corresponding strap lock, and a use position, in which the juvenile seat is fully installed on the seat base and each strap anchor is free to be removed from each strap lock to attach to the harness buckle.

2. The child restraint of claim 1, wherein the first and second strap anchors are configured to separate from the first and second strap locks when the juvenile seat is attached to the seat base in the use position.

3. The child restraint of claim 1, wherein the juvenile seat is configured to separate from the seat base to the base-installation position when the first and second strap anchors are received in the first and second strap locks.

4. The child restraint of claim 1, wherein the first strap lock is located in a first thigh region of the juvenile seat, the second strap lock is located in a second thigh region of the juvenile seat, and the harness buckle is located between first and second thigh regions of the juvenile seat.

5. The child restraint of claim 1, wherein the first and second harness straps and the harness buckle are located within a child-receiving space provided by the juvenile seat, and the first and second strap locks are located below a seating surface of the seat bottom.

6. The child restraint of claim 5, wherein the juvenile seat is formed to include: (i) a first aperture in an outer surface of a first lateral side of the juvenile seat facing away from the child-receiving space and (ii) a second aperture in an outer surface of a second lateral side of the juvenile seat facing away from the child-receiving space and away from the first aperture, the first aperture is configured to receive the first strap anchor leading to the first strap lock and the second aperture is configured to receive the second strap anchor leading to the second strap lock when the juvenile seat is in the base-installation position.

7. The child restraint of claim 1, wherein at least one of the seat base and the juvenile seat includes a latch configured to retain the juvenile seat to the seat base and at least one of the seat base and the juvenile seat includes a release actuator configured to release the latch to allow separation of the juvenile seat from the seat base, and wherein at least one of the latch and the release actuator are movable when the first and second strap anchors are installed with the first and second strap locks.

8. A child restraint comprising a seat base adapted to be secured to a vehicle seat, the seat base comprising a seat-base foundation formed to include a vehicle seatbelt path, a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat, a juvenile seat configured to be installed on the seat base, the juvenile seat includes a seat bottom, a seat back arranged to extend upwardly from the seat bottom, and a child-restraint harness configured to restrain a child to the juvenile seat, the child restraint harness includes first and second harness straps and a harness buckle, each harness strap having a corresponding strap anchor configured to couple to the harness buckle, and a seat-release system including at least one strap lock coupled to the juvenile seat and spaced apart from the harness buckle, wherein the juvenile seat is blocked from separating from the seat base until at least one of the first and second strap anchors is received in the at least one strap lock.

9. The child restraint of claim 8, wherein the juvenile seat is movable relative to the seat base between a base-installation position, in which the juvenile seat is separated from the seat base and at least one strap anchor is coupled to the at least one strap lock, and a use position, in which the juvenile seat is fully installed on the seat base and the at least one strap anchor is free to be removed from the at least one strap lock to attach to the harness buckle.

10. The child restraint of claim 9, wherein the first and second strap anchors are configured to separate from the at least one strap lock when the juvenile seat is attached to the seat base in the use position.

11. The child restraint of claim 8, wherein the at least one strap lock includes a first strap lock located in a first thigh region of the juvenile seat and a second strap lock located in a second thigh region of the juvenile seat, and wherein the harness buckle is located between the first and second thigh regions of the juvenile seat.

12. The child restraint of claim 8, wherein the first and second harness straps and the harness buckle are located within a child-receiving space provided by the juvenile seat, and the at least one strap lock is located below a seating surface of the seat bottom.

13. The child restraint of claim 8, wherein the juvenile seat is formed to include: (i) a first aperture in an outer surface of a first lateral side of the juvenile seat facing away from the child-receiving space and (ii) a second aperture in an outer surface of a second lateral side of the juvenile seat facing away from the child-receiving space and away from the first aperture, the first aperture is configured to receive the first strap anchor leading to a first strap lock included in the at least one strap lock and the second aperture is configured to receive the second strap anchor leading to a second strap lock included in the at least one strap lock when the juvenile seat is in the base-installation position.

14. Child restraint of claim 8, wherein at least one of the seat base and the juvenile seat includes a latch configured to retain the juvenile seat to the seat base and at least one of the seat base and the juvenile seat includes a release actuator configured to release the latch to allow separation of the juvenile seat from the seat base, and wherein at least one of the latch and the release actuator are movable when at least one of the first and second strap anchors is installed with the at least one strap lock.

15. A child restraint comprising a seat base adapted to be secured to a vehicle seat, the seat base comprising a seat-base foundation formed to include a vehicle seatbelt path, a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat, a juvenile seat configured to be installed on the seat base, the juvenile seat includes a seat bottom, a seat back arranged to extend upwardly from the seat bottom, and a child-restraint harness configured to restrain a child to the juvenile seat, the child restraint harness includes first and second harness straps and a harness buckle, each harness strap having a corresponding strap anchor configured to couple to the harness buckle, and a seat-release system including at least one strap lock coupled to the juvenile seat and spaced apart from the harness buckle and configured to receive at least one of the first and second strap anchors, wherein the juvenile seat is detachable from the seat base and at least one strap anchor is blocked from separating from the at least one strap lock by the at least one strap lock while the juvenile seat is detached from the seat base.

16. The child restraint of claim 15, wherein the juvenile seat is movable relative to the seat base between a base-installation position, in which the juvenile seat is separated from the seat base and at least one strap anchor is coupled to a corresponding strap lock and blocked from removal from the corresponding strap lock, and a use position, in which the juvenile seat is fully installed on the seat base and the at least one strap anchor is free to be removed from each corresponding strap lock to attach to the harness buckle.

17. Child restraint of claim 16, wherein the first and second strap anchors are configured to separate from the at least one strap lock when the juvenile seat is attached to the seat base in the use position.

18. The child restraint of claim 15, wherein the at least one strap lock includes a first strap lock located in a first thigh region of the juvenile seat and a second strap lock located in a second thigh region of the juvenile seat, and the harness buckle is located between the first and second thigh regions of the juvenile seat.

19. The child restraint of claim 15, wherein at least a portion of the first and second harness straps and at least a portion of the harness buckle are located within a child-receiving space provided by the juvenile seat, and the at least one strap lock is located below a seating surface of the juvenile seat.

20. The child restraint of claim 15, wherein at least one of the seat base and the juvenile seat includes a latch configured to retain the juvenile seat to the seat base and at least one of the seat base and the juvenile seat includes a release actuator configured to release the latch to allow separation of the juvenile seat from the seat base, and wherein at least one of the latch and the release actuator are movable when at least one of the first and second strap anchors is installed with at the least one seat lock.

* * * * *